United States Patent
Howland

(10) Patent No.: US 10,119,793 B2
(45) Date of Patent: Nov. 6, 2018

(54) MULTI-LAYER SLASH PROTECTIVE BODY ARMOR

(71) Applicant: Warwick Mills Inc., New Ipswich, NH (US)

(72) Inventor: Charles A Howland, Temple, NH (US)

(73) Assignee: Warwick Mills Inc., New Ipswich, NH (US)

( * ) Notice: Subject to any disclaimer, the term of this patent is extended or adjusted under 35 U.S.C. 154(b) by 0 days.

(21) Appl. No.: 15/299,959

(22) Filed: Oct. 21, 2016

(65) Prior Publication Data

US 2017/0115098 A1    Apr. 27, 2017

Related U.S. Application Data

(60) Provisional application No. 62/244,895, filed on Oct. 22, 2015.

(51) Int. Cl.
*F41H 5/04* (2006.01)
*F41H 1/02* (2006.01)
(Continued)

(52) U.S. Cl.
CPC ............ *F41H 5/0492* (2013.01); *B32B 3/18* (2013.01); *B32B 5/022* (2013.01); *B32B 5/024* (2013.01);
(Continued)

(58) Field of Classification Search
CPC ....................................................... F41H 5/04
See application file for complete search history.

(56) References Cited

U.S. PATENT DOCUMENTS

| 4,316,286 A | 2/1982 | Klein |
| 4,810,559 A * | 3/1989 | Fortier ............... A41D 13/0156 156/232 |

(Continued)

FOREIGN PATENT DOCUMENTS

| EP | 611943 A1 | 8/1994 |
| WO | 200031494 A1 | 6/2000 |

OTHER PUBLICATIONS

International Search Report and Written Opinion of International Application No. PCT/US2016/058113, dated Jul. 21, 2107, 14 pages.

(Continued)

*Primary Examiner* — Andrew T Piziali
(74) *Attorney, Agent, or Firm* — Maine Cernota & Rardin

(57) ABSTRACT

A slash-protecting panel is affordable, comfortable, flexible, light, and concealable, while providing at least 80N HOSDB slash protection. A plurality of solid elements are aligned on upper and lower backing sheets in rows and columns separated by continuous gaps between 25% and 95% as wide as the solid elements, the upper elements being centered above the gap intersections of the lower elements, leaving isolated gap "islands" uncovered but no continuous gaps. Embodiments further include a third layer with smaller "button" solid elements arranged behind the gap islands, leaving no gaps. The solid elements can be ceramic or metal, and the backing sheets can be ballistic fabric, or any convenient woven, non-woven, or warp knit. Solid elements can be attached to the sheets by rivets or adhesives, or held in pockets. Embodiments include an inner and/or an outer covering layer of a knit or similar fabric for added comfort.

19 Claims, 10 Drawing Sheets

(51) Int. Cl.
  *B32B 7/12* (2006.01)
  *B32B 5/02* (2006.01)
  *B32B 5/26* (2006.01)
  *B32B 3/18* (2006.01)
(52) U.S. Cl.
  CPC ............. *B32B 5/026* (2013.01); *B32B 5/26* (2013.01); *B32B 7/12* (2013.01); *F41H 1/02* (2013.01); *B32B 2317/10* (2013.01); *B32B 2367/00* (2013.01); *B32B 2571/02* (2013.01)

(56) References Cited

U.S. PATENT DOCUMENTS

| | | | |
|---|---|---|---|
| 5,316,820 A * | 5/1994 | Harpell | ............. B32B 3/16 428/102 |
| 5,514,241 A | 5/1996 | Gould et al. | |
| 5,601,895 A | 2/1997 | Cunningham | |
| 7,241,709 B2 | 7/2007 | Chiou | |
| 8,245,319 B2 | 8/2012 | Neal | |
| 2008/0087161 A1 | 4/2008 | Dean et al. | |
| 2008/0119099 A1 | 5/2008 | Palley | |
| 2011/0296979 A1 | 12/2011 | Howland | |
| 2012/0415968 | 6/2012 | Howland | |

OTHER PUBLICATIONS

International Search Report of PCT Appl No. PCT/US2015/044157 filed Aug. 7, 2015, dated Jun. 7, 2016.
Written Opinion of PCT Appl No. PCT/US2015/044157 filed Aug. 7, 2015, dated Jun. 7, 2016.
International Preliminary Report on Patentability of PCT Application No. PCT/US2015/044157 filed Aug. 7, 2015, dated Feb. 14, 2017.

* cited by examiner

MULTI-LAYER SLASH PROTECTIVE BODY ARMOR

RELATED APPLICATIONS

This application claims the benefit of U.S. Provisional Application No. 62/244,895, filed Oct. 22, 2015, which is herein incorporated by reference in their entirety for all purposes.

FIELD OF THE INVENTION

The invention relates to body armor, and more particularly, to flexible, concealable, lightweight body armor for protection against slash threats.

BACKGROUND OF THE INVENTION

It is obvious that body armor cannot protect a user who is at risk unless the body armor is worn by the user. Accordingly, while it is important that body armor provide adequate protection to the user, it is equally important that the body armor be affordable and reasonably comfortable to wear, without unduly hindering the movements of the user, and without requiring the user to carry an unacceptable amount of excess weight. In addition, it is often important that body armor be concealable, so that the wearer does not feel overly conspicuous, and so that enemy combatants, terrorists, criminals, or other antagonists are not prompted to selectively direct their attacks toward unprotected parts of the body.

Accordingly, body armor is usually designed to protect against a specified maximum threat of a specified type or types. This is because an armor solution that is designed to protect against types of threats and/or magnitudes of threats that are not likely to be encountered by a user will generally be too expensive, too cumbersome, and/or too uncomfortable for the user, and will likely not be used consistently.

There are many industries and circumstances where protection against slash threats would be of value, but protection against other types of threats is not needed. Examples include the meat cutting industry, water-jetting applications, certain types of security, and many others. One standard test for protection against slash threats is the Home Office Scientific Development Branch ("HOSDB") slash resistance standard for UK police (2006). According to this test, adequate protection requires that there be virtually no penetration of the armor by a specified "Stanley" knife (essentially a box cutting knife) moving at a specified angle across the armor at a specified speed and having a cut-through force of greater than eighty Newtons (80 N).

It can be difficult and prohibitively expensive to provide this degree of slash protection using only protective fabrics such as para-aramid. Accordingly, slash-protective armor typically requires the use of solid panels, typically made from ceramic or from steel or other metals.

One approach is to use a "multi-threat" armor system that offers protection against several threats, for example stab, slash, and projectile threats. Some of these designs include large plates of metal or ceramic, while others include a mosaic of adjacent or nearly adjacent tiles of ceramic or metal. While these solutions can provide adequate slash protection, they are typically expensive, heavy, and stiff, and can also be difficult to conceal. Many of these solutions also have very low air and moisture permeability, thereby causing the armor to chafe and to overheat the user. Hence, if protection is required only against slash threats, such multi-threat solutions are far from optimal.

An approach that is directed specifically, and more or less exclusively, to slash protection is chain mail. However, chain mail tends to be heavy and rough-textured, and is also very expensive to manufacture. Accordingly, chain mail is also far from optimal.

What is needed, therefore, is a body armor design that provides good protection against slash threats, and at the same time is affordable and reasonably comfortable to wear, does not unduly hinder the movements of the user, does not require the user to carry unreasonably excess weight, and is concealable.

SUMMARY OF THE INVENTION

The present invention is a body armor panel that provides good protection against slash threats, and at the same time is affordable and reasonably comfortable to wear, does not unduly hinder the movements of the user, and does not require the user to carry unreasonably excess weight. Many embodiments are also concealable.

According to the invention, an armor panel is provided that includes two "primary" layers, each of which includes a backing sheet of fabric to which is affixed a plurality of solid elements that are spaced apart from each other. The solid elements, which may be square, rectangular, hexagonal, round, or any other convenient shape, are aligned vertically and horizontally in the array such that there is a continuous vertical gap between each vertical column of solid elements and a continuous horizontal gap between each horizontal row of solid elements.

Depending on the embodiment, the vertical gaps and the horizontal gaps are each between 25% and 95% as large as the widths and heights respectively of the solid elements. If the vertical and horizontal gaps are not uniform in width along their lengths, then the gaps at their narrowest points are between 25% and 95% as large as the widths and heights of the solid elements at their tallest and widest points.

The two primary layers are maintained in the panel relative to each other such that that the solid elements of the upper primary layer are centered above the intersections where the vertical gaps and the horizontal gaps of the lower primary layer meet. Because the gaps are narrower than the widths/heights of the solid elements, when the two layers are combined there are no continuous gaps in the resulting panel. Instead, there are local gap "islands" that are not covered by either the upper or lower solid elements, but these gap islands are smaller in width and height than the solid elements, and do not extend vertically or horizontally in a continuous manner.

Embodiments further include a third, "button" layer having solid elements, sometimes referred to herein as "buttons," that are positioned behind the gap islands of the two primary layers. In embodiments, the "button" solid elements on this third layer are smaller in width and height than the solid elements on the first and second primary layers and do not extend vertically or horizontally in a continuous manner.

In some embodiments, the backing sheets are sheets of a ballistic fabric such as para-aramid. In other embodiments, the backing sheets are made from any convenient material that will maintain the spacing of the solid elements in the array. Various embodiments use a woven, non-woven, or warp knit fabric for the backing sheets. For example, embodiments use light weight carriers such as PET, cotton, nylon, or a blend of natural and/or synthetic fibers according to the requirements of the application.

Due to the gap islands that are not covered by solid elements of the two primary layers, and depending on the fabric(s) used for the backing sheets, embodiments provide excellent permeability to air, heat, and moisture. In some embodiments, the panel further includes an inner covering layer and/or an outer covering layer of a knit or similar fabric for added comfort.

Due to the continuous vertical and horizontal gaps between the solid elements in the separate layers, the layers are inherently very flexible. In some embodiments, the layers are attached to each other only around their peripheries, while in other embodiments there are points or lines of attachment throughout the panel. However, in all embodiments the attachment between the layers is such that they are able to slide past each other to a degree sufficient to allow nearly unrestricted bending and flexing of the assembled panel.

The solid elements can be attached to the backing sheets by any applicable attachment means known in the art, such as by rivets or by enclosure in pockets. For example, the solid elements can be placed on a backing sheet and overlaid by a cover sheet, which is then adhered or sewn to the backing sheet so as to capture the solid elements in pockets formed between the sheets.

In other embodiments, at least some of the solid elements are adhered to their respective backing sheets by an adhesive, such as by thermoplastic urethane, reactive urethane, sulfur cure, or a thermoplastic elastomer.

Embodiments of the invention having only the two primary layers with solid elements made of cold-rolled, work-hardened ASTM 301 stainless steel that are only 0.01 inches thick and have a hardness of between 40 and 55 on the Rockwell C scale can provide more than 80 N of slash resistance as measured by the HOSDB test, while having a mass of only 0.2 pounds per square foot. Embodiments of the inventions that include a third, "button" layer can provide more than 100N of slash resistance as measured by the HOSDB test. For example, in one three-layer embodiment a panel that provides over 100 N of slash resistance includes solid elements made of cold-rolled, work-hardened ASTM 301 stainless steel that are only 0.01 inches thick and have a hardness of between 40 and 55 on the Rockwell C scale. In this embodiment, the panel thickness is between 0.4 and 0.5 inches, and the mass is only 0.5 pounds per square foot. Due to the light weight, thinness, and high flexibility, such two and three layer embodiments can be highly concealable.

Embodiments can be integrated into various garments, such as aprons, sleeves, smocks, jackets, and shirts. For example, a vest-type panel can be attached to the shoulders of an inner T-shirt, and then an outer T-shirt can be sewn to the inner T-shirt, so that the slash-protective panel is encapsulated between the two shirts and the solid elements are thereby surrounded by softer knit textile layers.

The surprising degree of slash protection provided by two layer embodiments of the present invention is due to the manner in which a blade, such as a Stanley knife, interacts with the solid elements during a slash. Because the blade is in continuous motion, it is pushed slightly upward as the tip of the blade moves across a solid element. As the tip crosses a gap island, it begins to fall back toward the backing sheets, but it is blocked by the next solid element before there can be significant penetration of the backing sheets. Because the gap sizes in the two primary layers are smaller than the corresponding widths and heights of the solid elements, the gap islands are isolated from each other, and do not merge to form continuous, unprotected paths through which a blade could travel and cut through the backing sheets. Typically, the gap sizes will not be larger than the minimum blade width against which the armor is designed to provide protection.

For three layer embodiments, the button solid elements that fill the gap islands prevent any penetration from the Stanley knife.

In addition, the hardness of the solid elements in embodiments tends to blunt the slashing blade as the blade slides over the edges of the first few solid elements. This effect can further increase the resistance of the panel to slash attacks.

It will be clear to those of skill in the art that many embodiments offer a low cost of manufacture. For example applying adhesive to steel squares or rectangles, adhering them to two flat sheets of fabric, and then sewing the flat sheets together around their periphery represents a significant cost saving as compared to the manufacture e.g. of a panel of chain mail.

While the invention is described herein principally with reference to body armor, it will be understood that the invention is in fact applicable to any requirement for slash protection, such as flexible coverings placed over fragile or valuable objects, fabrics surrounding stretchable passages leading between subway or railroad cars, and such like.

One general aspect of the present invention is a slash-protecting armor panel that includes a first layer having a first plurality of solid elements affixed to a first backing sheet, and a second layer including a second plurality of solid elements affixed to a second backing sheet. The solid elements are aligned horizontally and vertically on the backing sheets in rows and columns that are separated so as to form intersecting vertical and horizontal gaps therebetween, widths of said vertical and horizontal gaps being between 25% and 95% of widths and heights respectively of the solid elements. The first and second layers are attached to each other so as to position the second plurality of solid elements centrally over the intersections of the vertical and horizontal gaps of the first layer, so that the panel thereby includes isolated gap islands that are bounded by said first and second solid elements but are not covered by any of said first and second solid elements.

In embodiments, the solid elements are square, rectangular, hexagonal, or circular. In any preceding embodiment, the solid elements can include rounded corners. In any preceding embodiment, the solid elements can be ceramic. In any preceding embodiment, the solid elements can be metal, and in some of these embodiments the solid elements are cold-rolled, work-hardened ASTM 301 stainless steel.

In any preceding embodiment, at least some of the solid elements can be riveted to said backing sheets. In any preceding embodiment, at least some of the solid elements can be held within pockets provided on said backing sheets. In any preceding embodiment, at least some of the solid elements can be attached by an adhesive to said backing sheets. And in some of these embodiments, the adhesive includes at least one of thermoplastic urethane, reactive urethane, sulfur cure elastomer, and thermoplastic elastomer.

In any preceding embodiment, at least one of the backing sheets can include a fabric containing fibers having a penetration resistance equal to or greater than para-aramid. In any preceding embodiment, at least one of the backing sheets can be a woven, a non-woven, or a warp knit. In any preceding embodiment, at least one of the backing sheets can include at least one of PET, cotton, and nylon.

In any preceding embodiment, the layers can be attached to each other only about their peripheries. In any preceding embodiment, the backing sheets can be attached to each other at least partly by stitching about a periphery of the panel.

In any preceding embodiment, the panel can be able to pass an 80 N HOSDB slash test. In any preceding embodiment, the armor panel can further include a knit textile cover layer located either above the second layer or below the first layer.

In any preceding embodiment, the armor panel can further include a third layer behind said first and second layers, said third layer including a third plurality of solid elements affixed to a third backing sheet and arranged so as to position the third plurality of solid elements centrally behind the gap islands of the first and second layers. And in some of these embodiments the third plurality of solid elements are metal, ceramic, or cold-rolled 301 steel.

A second general aspect of the present invention is a slash-protecting garment comprising a slash-protecting panel that includes a first layer including a first plurality of solid elements affixed to a first backing sheet and a second layer including a second plurality of solid elements affixed to a second backing sheet. The solid elements are aligned horizontally and vertically on the backing sheets in rows and columns that are separated so as to form intersecting vertical and horizontal gaps therebetween, widths of said vertical and horizontal gaps being between 25% and 95% of widths and heights respectively of the solid elements. The first and second layers are attached to each other so as to position the second plurality of solid elements centrally over the intersections of the vertical and horizontal gaps of the first layer, such that the panel thereby includes isolated gap islands that are bounded by said first and second solid elements but are not covered by any of said solid elements.

In embodiments, the garment is one of a T-shirt, a shirt, an apron, a sleeve, a smock, a jacket, and a pair of pants. And any preceding embodiments can further include a third layer behind said first and second layers, said third layer including a third plurality of solid elements affixed to a third backing sheet and arranged so as to position the third plurality of solid elements centrally behind the gap islands of the first and second layers.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a body armor panel that provides good protection against slash threats, and at the same time is affordable and reasonably comfortable to wear, does not unduly hinder the movements of the user, and does not require the user to carry unreasonably excess weight. Many embodiments are also concealable.

Figure 1:
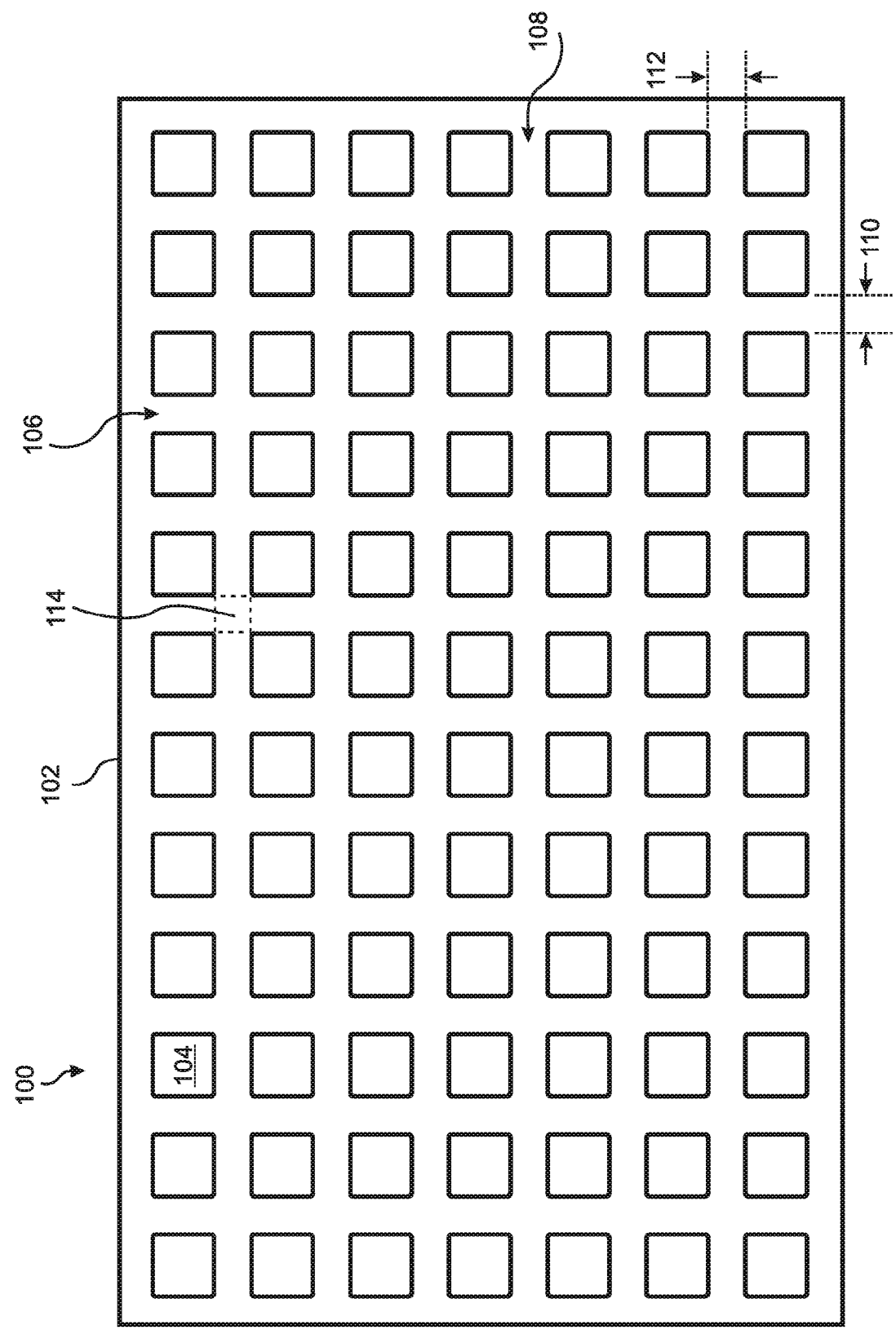
FIG. 1 is a top view, drawn to scale, of a single first or second layer of a panel in an embodiment of the present invention.

According to the invention, an armor panel is provided that includes two primary layers. A single primary layer 100 is illustrated in FIG. 1. The layer includes a backing sheet 102 of fabric to which is affixed a square array of solid elements 104. The solid elements 104, which are square in the figure, but in other embodiments are rectangular, hexagonal, round, or any other convenient shape, are aligned vertically and horizontally in the array such that there is a continuous vertical gap 106 between each vertical column of solid elements 104 and a continuous horizontal gap 108 between each horizontal row of solid elements 104.

In the embodiment of FIG. 1, the widths 110, 112 of the gaps 106, 108 are approximately 63% as large as the widths of the solid elements 104. In similar embodiments, the vertical gaps 110 and the horizontal gaps 112 are each between 25% and 95% as large as the widths and heights respectively of the solid elements 104. In embodiments where the vertical and horizontal gaps are not uniform in width along their lengths, the gaps at their narrowest points are between 25% and 95% as large as the widths and heights of the solid elements at their widest and tallest points respectively.

The solid elements 104, 204 can be attached to the backing sheets 102 by any applicable attachment means known in the art, such as by rivets or enclosure in pockets. For example, the solid elements 104, 204 can be placed on a backing sheet 102 and overlaid by a cover sheet (not shown), which is then adhered or sewn to the backing sheet 102 so as to capture the solid elements 104, 204 in pockets formed between the sheets.

In the embodiment of FIG. 1, the solid elements 104, 204 are adhered to the backing sheet 102 by an adhesive. In various embodiments, suitable adhesives can include thermoplastic urethane, reactive urethane, sulfur cure, or a thermoplastic elastomer.

Figure 2A:
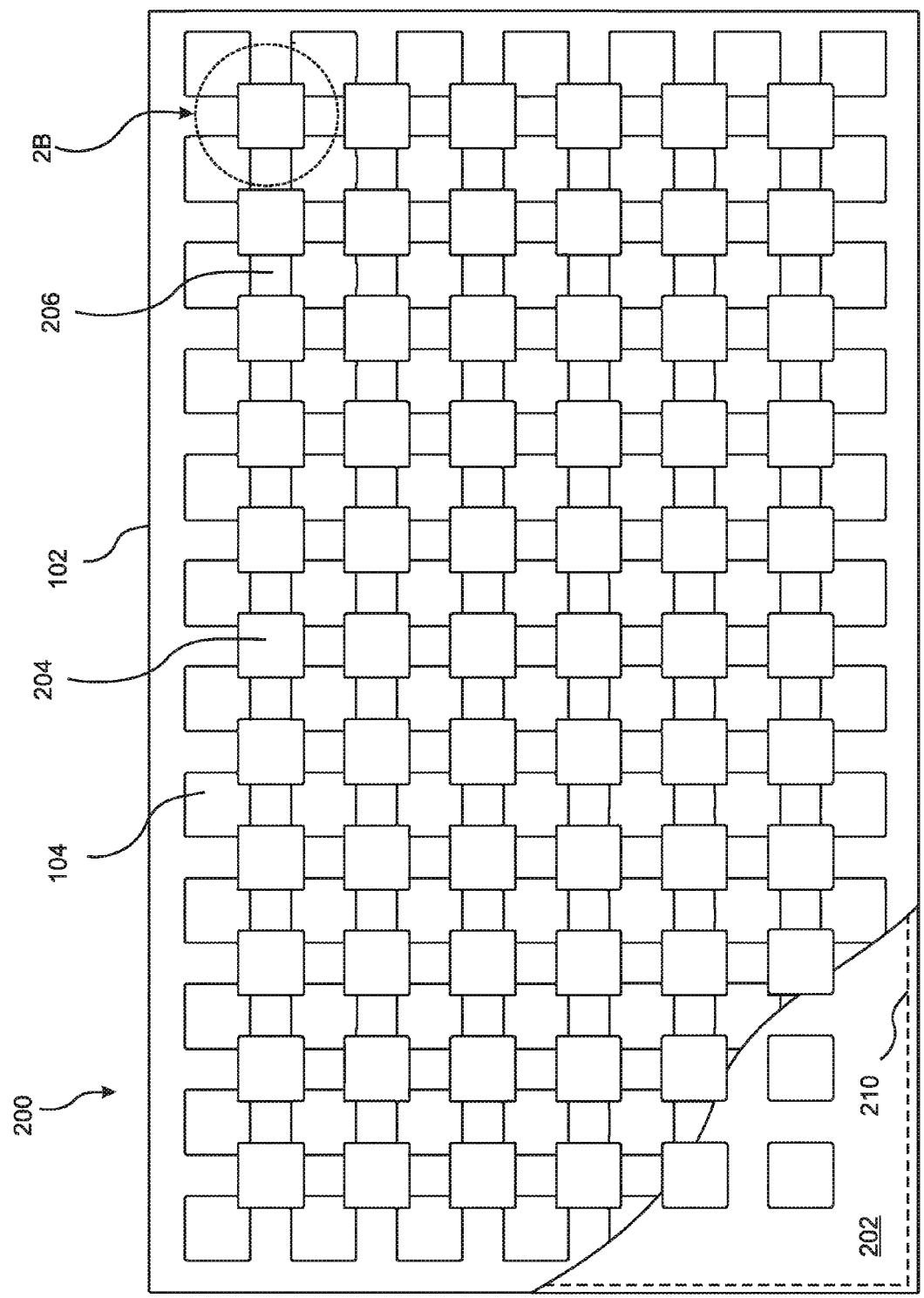
FIG. 2A is a top view drawn to scale of a two layer panel in an embodiment of the present invention that comprises two of the layers of FIG. 1 overlaid and attached about their periphery by a sewn hem.
Figure 2B:
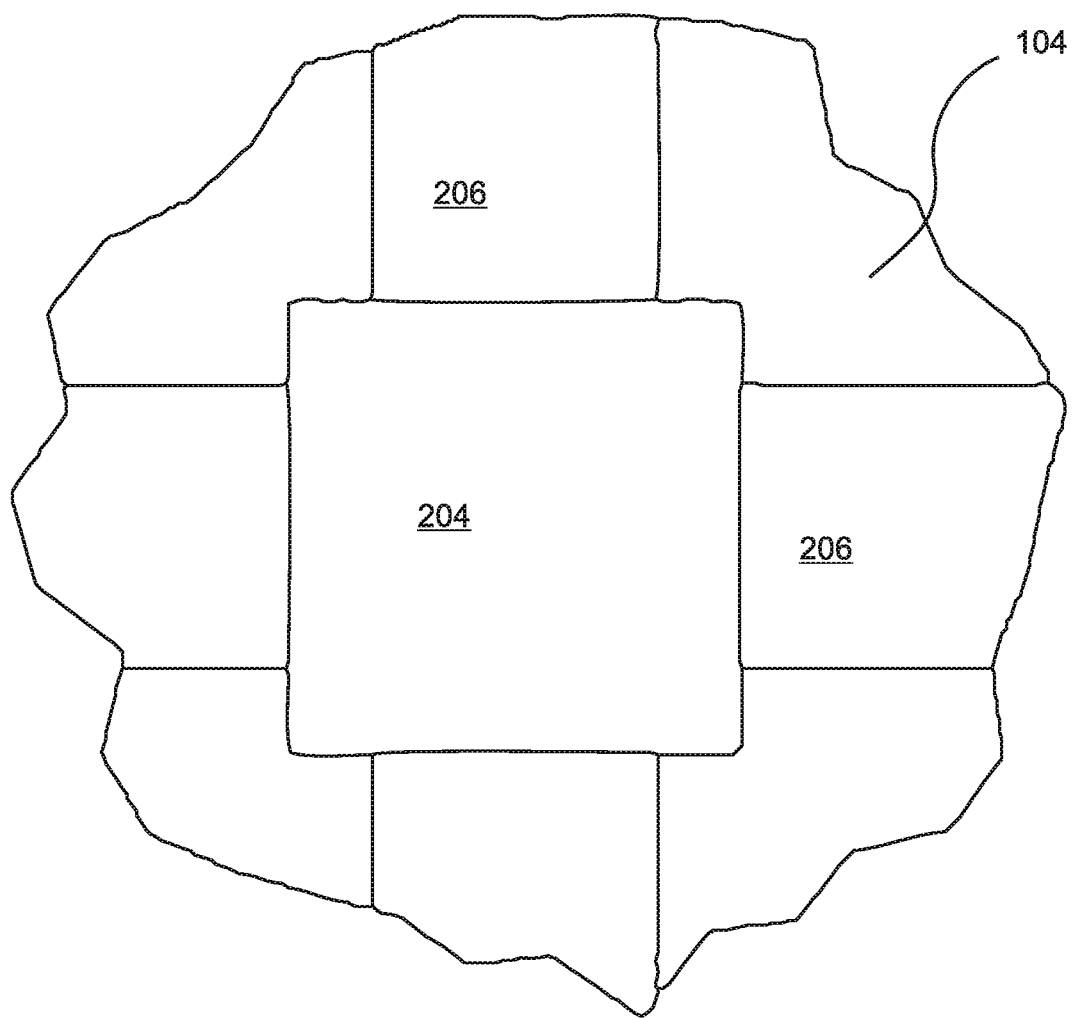
FIG. 2B is an enlargement drawn to scale of a region of the panel of FIG. 2A.

With reference to FIG. 2, the two primary layers of the panel 200 are maintained relative to each other such that that the solid elements of the upper primary layer 204 are centered above the intersections 114 where the vertical gaps 106 and the horizontal gaps 108 of the lower primary layer meet. Note that, for clarity of illustration, the backing sheet 202 of the upper layer is shown as a cut-away in the lower left portion of the figure, thus allowing the lower solid elements 104 to be visible below the upper solid elements 204 in the remainder of the panel 200.

Because the vertical and horizontal gaps 106, 108 are narrower than the widths and heights of the solid elements 104, 204 in the two primary layers, when the two primary layers are combined there are no continuous gaps in the resulting panel 200. Instead, there are local gap "islands" 206 that are not covered by either the upper 104 or lower 204 solid elements. These gap islands 206 are smaller in width and height than the solid elements 104, 204, so that they do not extend vertically or horizontally in a continuous manner.

Due to the gap islands 206 between the solid elements 104, 204, and depending on the fabric(s) used for the backing sheets 102, 202, embodiments provide excellent permeability to air, heat, and moisture. In some embodiments, the panel 200 further includes an inner covering layer and/or an outer covering layer of a knit or similar fabric for added comfort (not shown).

Figure 3A:
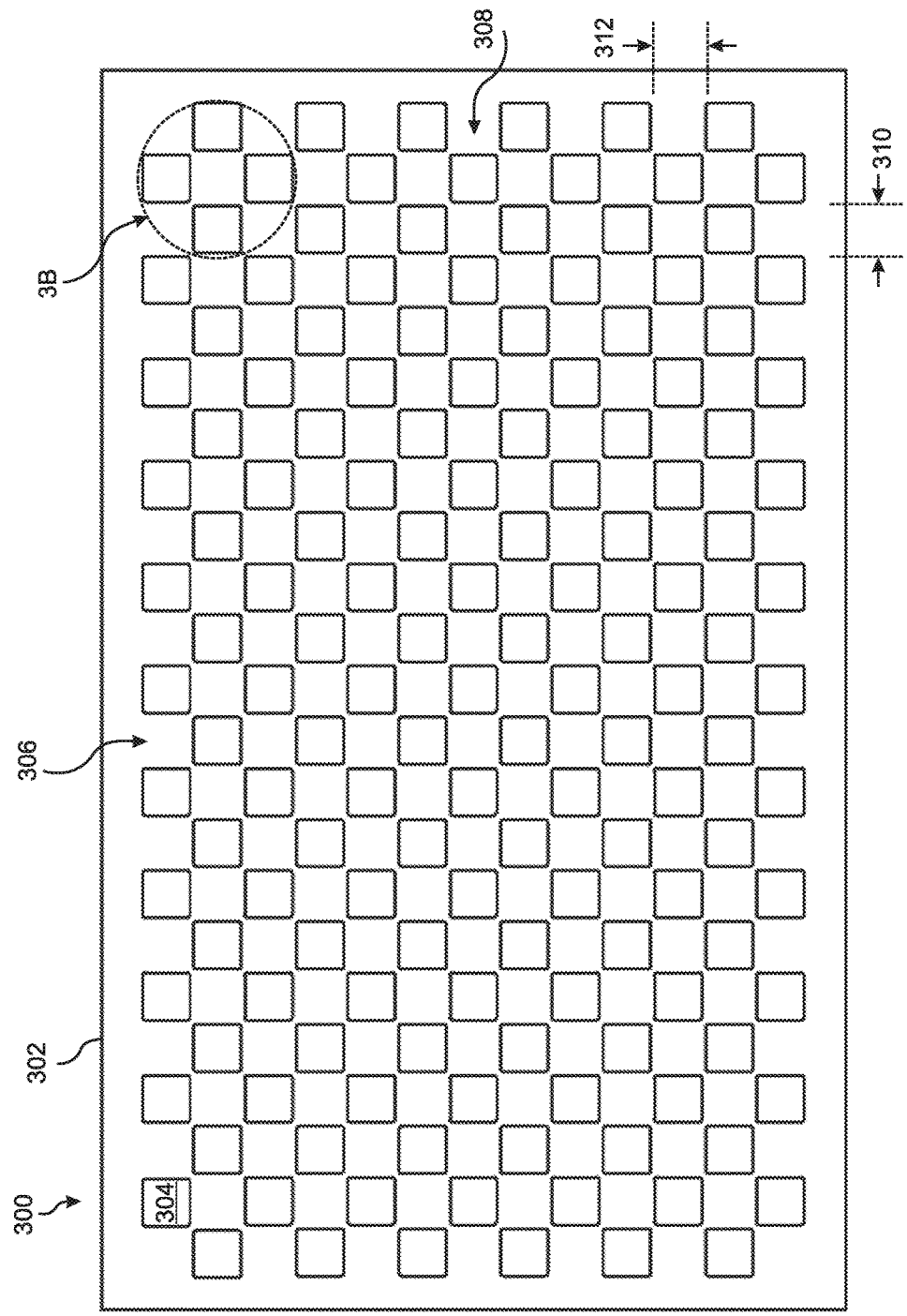
FIG. 3A is a top view, drawn to scale, of a third layer of a three layer panel in an embodiment of the present invention.
Figure 3B:
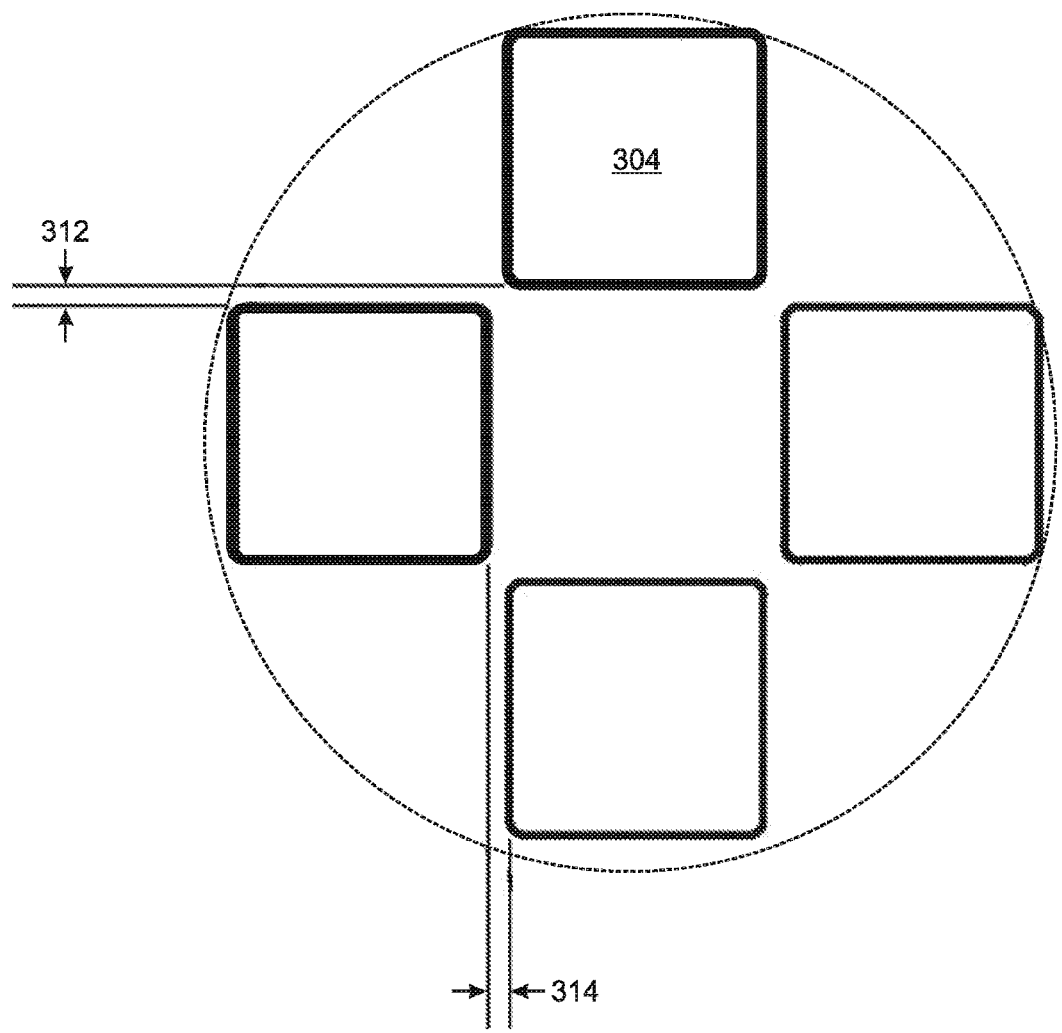
FIG. 3B is an enlargement drawn to scale of a region of the third layer of FIG. 3A.
Figure 4A:
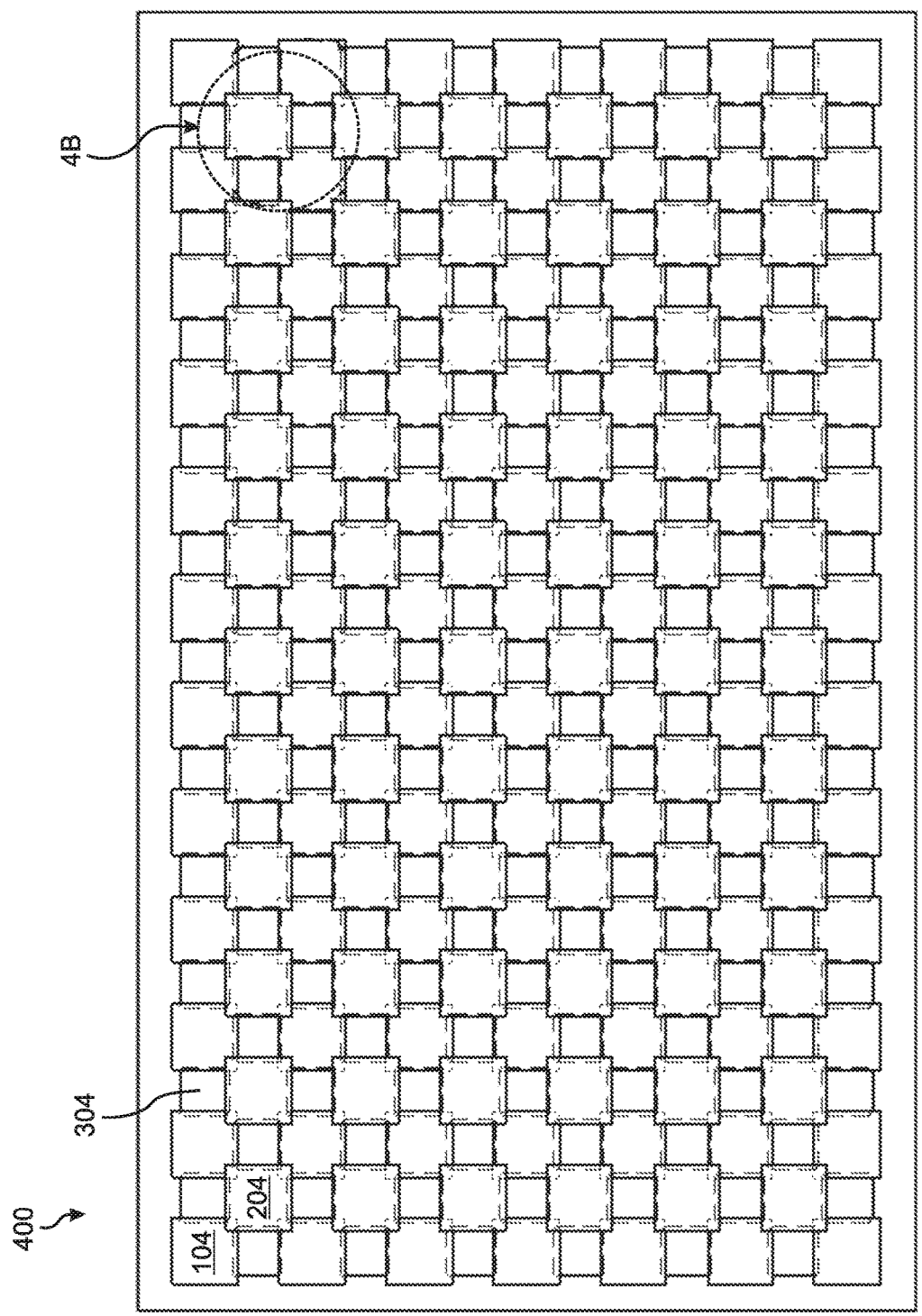
FIG. 4A is a top view, drawn to scale, of a three layer panel in an embodiment of the present invention.
Figure 4B:
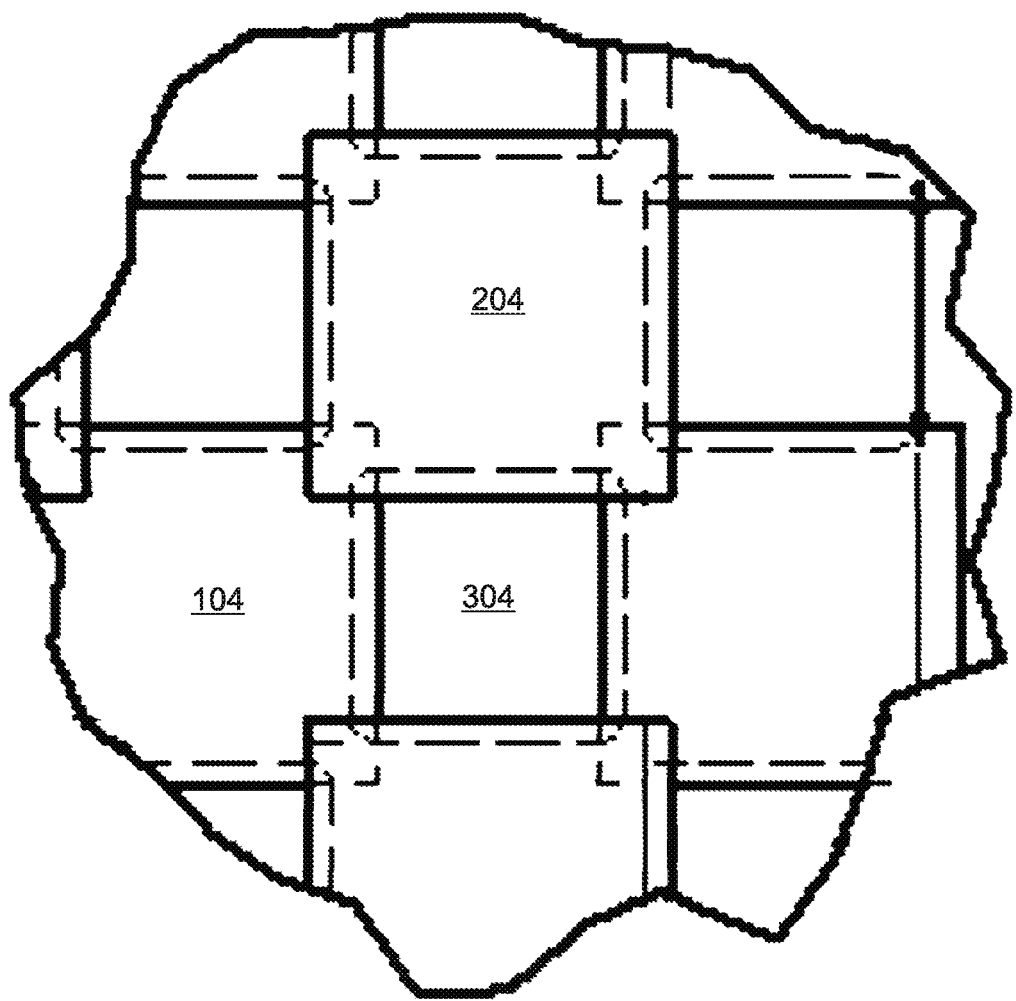
FIG. 4B is an enlargement drawn to scale of a region of the panel of FIG. 4A.

With reference to FIG. 3A, in some embodiments the local gap "islands" 206 of the two primary layers 100 are filled by smaller solid elements 304, referred to herein as "buttons," arranged in a third "button" layer 300 behind the two primary layers 100. As shown in FIG. 3A, where the other two layers 100 have been omitted, the button layer 300 includes solid elements 304 that are arranged in a "staggered" relationship such that the horizontal 308 and vertical 306 gaps within a given row or column are substantially blocked by the next row or column. As can be seen in the enlargement of FIG. 3B, the spaces 306, 308 between the button solid elements 304 are larger than the dimensions of the solid elements 304. Accordingly, the button panel 300 by itself does include narrow gaps that extend horizontally 312 and vertically 314, which help to increase the flexibility of the panel. However, when the three layers are combined, as shown in FIGS. 4A and 4B, there are no gaps in the resulting panel 400.

Due to the continuous vertical 106, 314 and horizontal 108, 312 gaps between the solid elements 104, 204, 304 in the separate layers, the layers are inherently very flexible. In the embodiments of FIGS. 2 and 4A the backing sheets 102, 202, 302 of the two or three layers are attached to each other only around their peripheries by a stitched hem 210 (not shown in FIG. 4A). In other embodiments there are points or lines of attachment throughout the panel 200, 300. However, in all embodiments the attachment between the backing sheets 102, 202, 302 is such that the layers are able to slide past each other to a degree that is sufficient to allow nearly unrestricted bending and flexing of the assembled panel 200, 300.

In some embodiments, some or all of the backing sheets 102, 202, 302 are sheets of a ballistic fabric such as para-aramid. In various embodiments, some or all of the backing sheets 102, 202, 302 are made from any convenient material that will maintain the spacing of the solid elements 104, 204, 304 in the array. Some embodiments use a woven, non-woven, or warp knit fabric for the backing sheets 102, 202, 302. For example, embodiments use light weight carriers such as PET, cotton, nylon, or a blend of natural and/or synthetic fibers, according to the requirements of the application.

Figure 5:
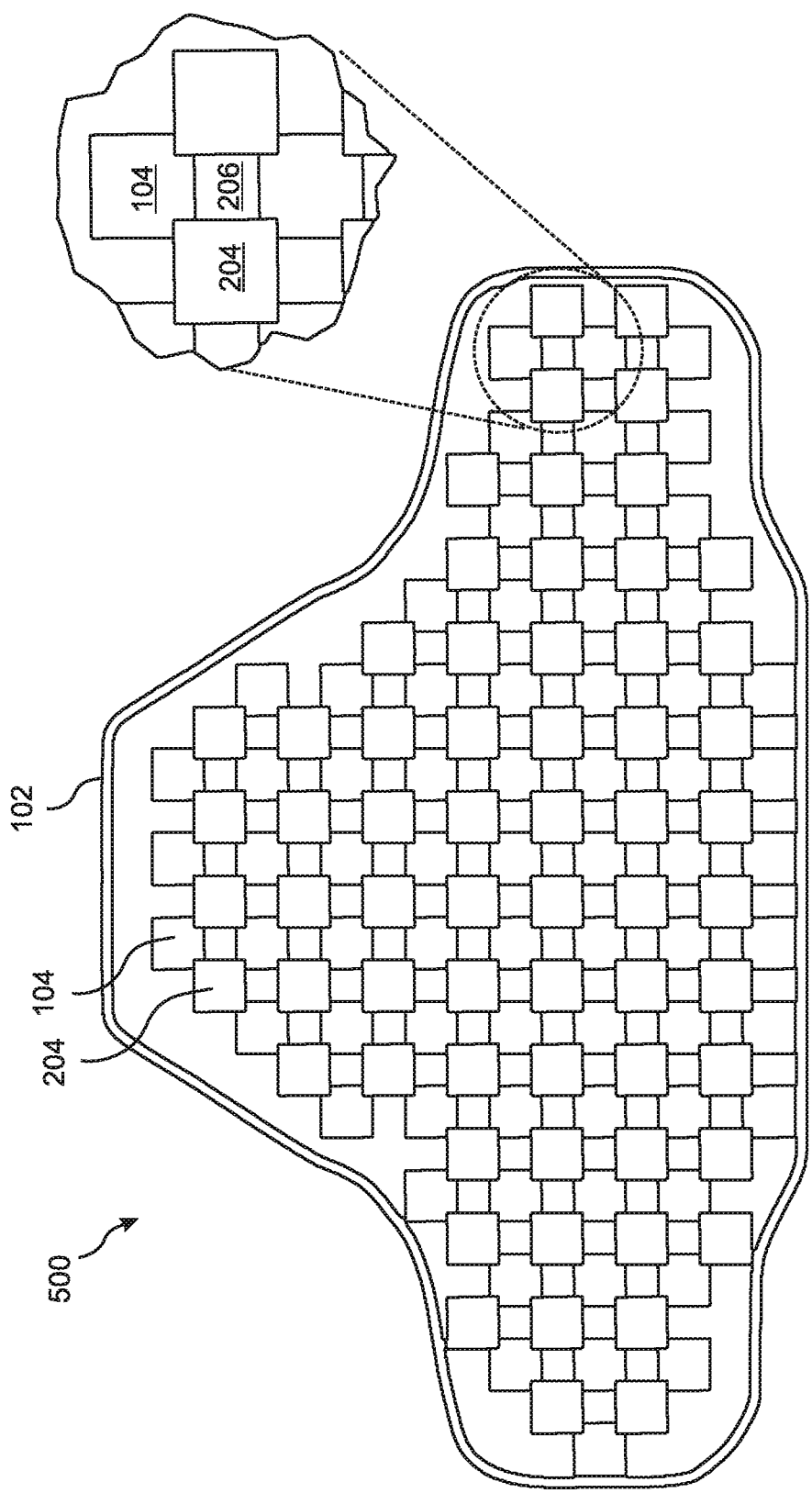
FIG. 5 is a top view drawn to scale of a panel similar to FIG. 2 but shaped as a vest panel.

FIG. 5 illustrates a two-layer embodiment shaped as a vest panel 300 that can be attached to the shoulders of an inner T-shirt. An outer T-shirt can then be sewn to the inner T-shirt, so that the slash-protective panel 500 is encapsulated between the two shirts and the solid elements 104, 204 are thereby surrounded by softer knit textile layers (not shown). In other embodiments, two layer and three layer panels of the present invention are integrated into various garments, such as aprons, sleeves, smocks, jackets, and shirts. For clarity of illustration, the backing sheet 202 of the upper layer 200 is not shown in FIG. 5, thus allowing the lower solid elements 104 to be visible below the upper solid elements 204.

Figure 6:
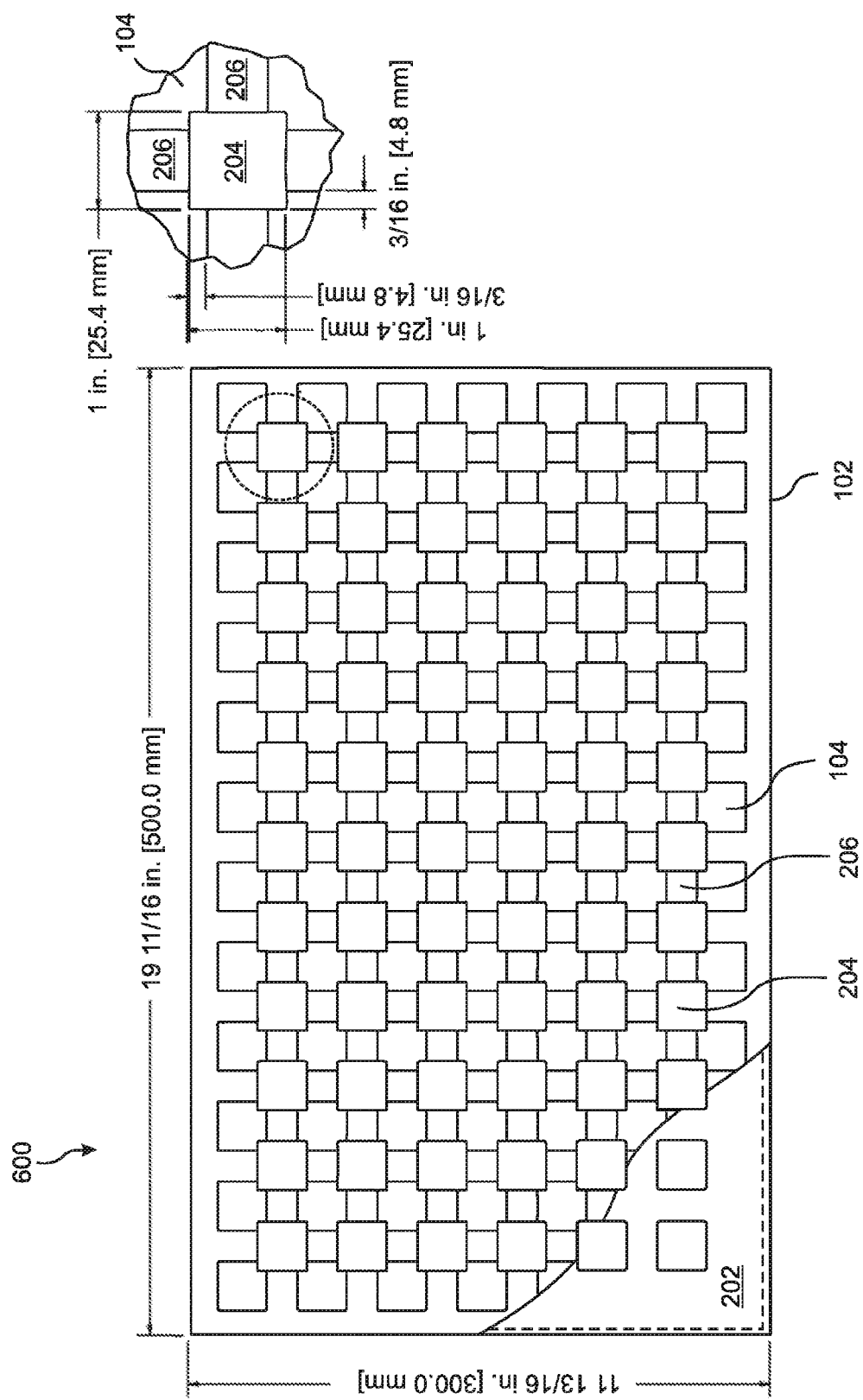
FIG. 6 is a top view drawn to scale of a two layer embodiment similar to FIG. 2 having specific dimensions and solid element materials.

FIG. 6 is a top view of a two layer embodiment similar to FIG. 2 that can resist between 80N and 100 N of slash force as measured by the HOSDB test. The panel 600 is 500 mm wide and 300 mm tall. The solid elements 104, 204 are squares of cold-rolled, work-hardened ASTM 301 steel with a hardness of 55 on the Rockwell C scale. They are one inch on each side, with a 1/32 inch radius at each corner, and are only 0.01 inches thick. The vertical and horizontal gaps in each layer are 5/8 inch wide, i.e. 62.5% of the widths and heights of the solid elements 104, 204, so that the solid elements overlap at their corners by 3/16 inch. The panel has a weight of 0.2 lb/ft$^2$, and a thickness of less than 0.5 inches, which makes the panel very concealable in many applications. As in FIG. 2, for clarity of illustration, the backing sheet 202 of the upper layer is shown in FIG. 6 as a cut-away in the lower left portion of the figure, thus allowing the lower solid elements 104 to be visible below the upper solid elements 204 in the remainder of the panel 600.

Figure 7:
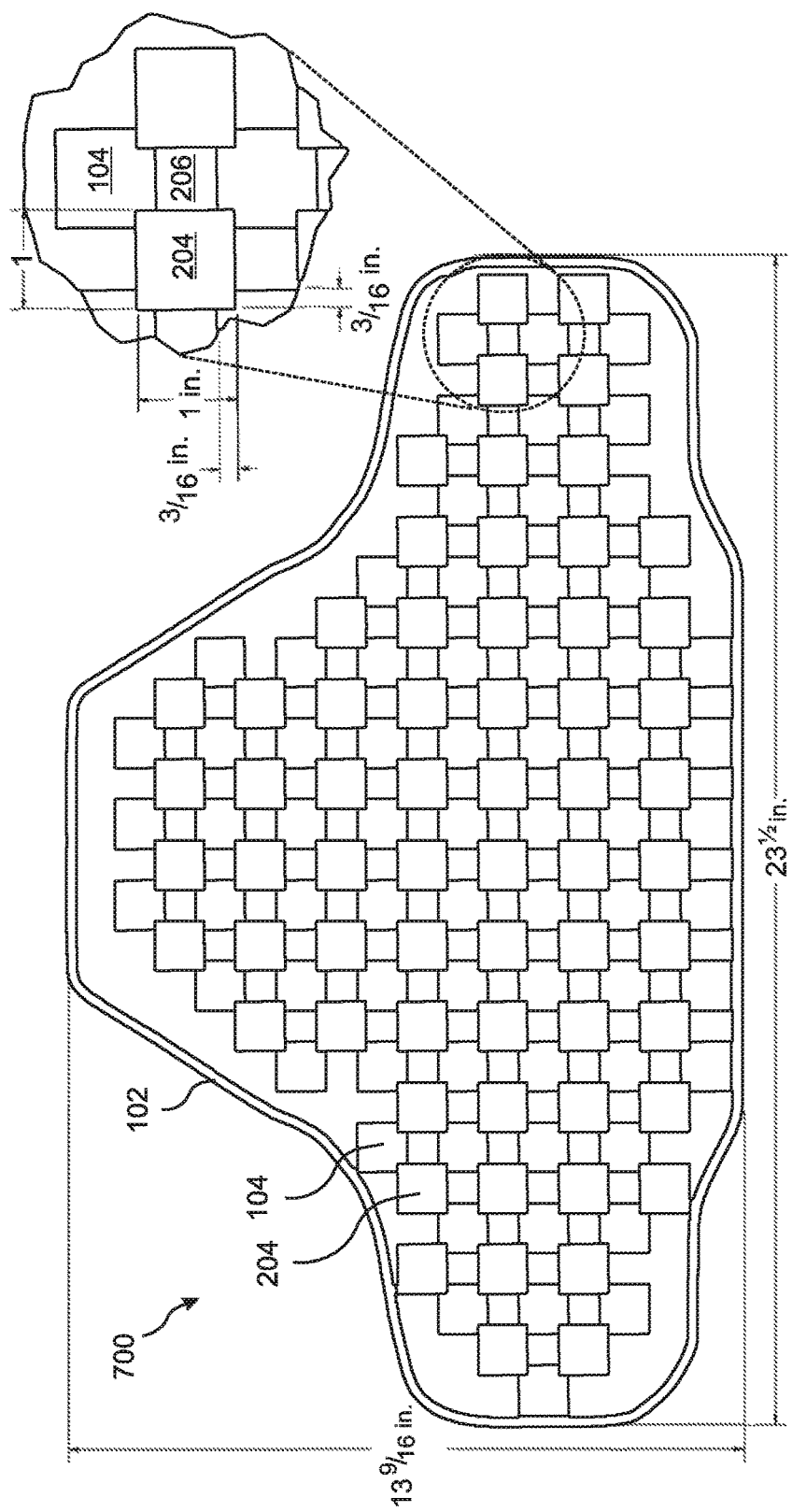
FIG. 7 is a top view drawn to scale of a two layer embodiment similar to FIG. 6, but shaped as a vest panel.

FIG. 7 is a top view of a panel 700 that is identical to the panel of FIG. 6 except that it is shaped as a vest panel, similar to FIG. 5. The panel is 23½ inches wide and 13 9/16 inches wide. As in FIG. 5, for clarity of illustration, the backing sheet 202 of the upper layer is not shown in the figure, thus allowing the lower solid elements 104 to be visible below the upper solid elements 204.

It will be clear to those of skill in the art that many embodiments offer a low cost of manufacture. For example, in the illustrated embodiments the solid elements are simply thin squares of steel with rounded corners, which are adhered to flat sheets of fabric by an adhesive. The flat sheets are then sewn together around their peripheries. This represents a significant cost saving as compared to the manufacture e.g. of a panel of chain mail.

While the invention is described herein principally with reference to body armor, it will be understood that the invention is in fact applicable to any requirement for slash protection, such as flexible coverings placed over fragile or valuable objects, fabrics surrounding stretchable passages leading between subway or railroad cars, and such like.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A slash-protecting armor panel, comprising:
   a first layer including a first plurality of unitary solid elements affixed to a first backing sheet; and
   a second layer including a second plurality of unitary solid elements affixed to a second backing sheet;
   said solid elements being aligned horizontally and vertically on said backing sheets in rows and columns that are separated so as to form intersecting vertical and horizontal gaps therebetween, widths of said vertical and horizontal gaps being between 25% and 95% of widths and heights respectively of the solid elements;
   said first and second layers being attached to each other so as to position the second plurality of solid elements centrally over the intersections of the vertical and horizontal gaps of the first layer; and
   said panel thereby including isolated gap islands that are bounded by said first and second solid elements but are not blocked by any solid elements in the slash-protecting armor panel.

2. The armor panel of claim 1, wherein the solid elements are square, rectangular, hexagonal, or circular.

3. The armor panel of claim 1, wherein the solid elements include rounded corners.

4. The armor panel of claim 1, wherein the solid elements are ceramic.

5. The armor panel of claim 1, wherein the solid elements are metal.

6. The armor panel of claim 5, wherein the solid elements are cold-rolled, work-hardened ASTM 301 stainless steel.

7. The armor panel of claim 1, wherein at least some of the solid elements are riveted to said backing sheets.

8. The armor panel of claim 1, wherein at least some of the solid elements are held within pockets provided on said backing sheets.

9. The armor panel of claim 1, wherein at least some of the solid elements are attached by an adhesive to said backing sheets.

10. The armor panel of claim 9, wherein the adhesive includes at least one of thermoplastic urethane, reactive urethane, sulfur cure elastomer, and thermoplastic elastomer.

11. The armor panel of claim 1, wherein at least one of the backing sheets includes a fabric containing fibers having a penetration resistance equal to or greater than para-aramid.

12. The armor panel of claim 1, wherein at least one of the backing sheets is a woven, a non-woven, or a warp knit.

13. The armor panel of claim 1, wherein at least one of the backing sheets includes at least one of PET, cotton, and nylon.

14. The armor panel of claim 1, wherein the layers are attached to each other only about their peripheries.

15. The armor panel of claim 1, wherein the backing sheets are attached to each other at least partly by stitching about a periphery of the panel.

16. The armor panel of claim 1, wherein the panel is able to pass an 80 N HOSDB slash test.

17. The armor panel of claim 1, further comprising a knit textile cover layer located either above the second layer or below the first layer.

18. A slash-protecting garment comprising a slash-protecting panel, said panel including:
   a first layer including a first plurality of unitary solid elements affixed to a first backing sheet; and
   a second layer including a second plurality of unitary solid elements affixed to a second backing sheet;
   said solid elements being aligned horizontally and vertically on said backing sheets in rows and columns that are separated so as to form intersecting vertical and horizontal gaps therebetween, widths of said vertical and horizontal gaps being between 25% and 95% of widths and heights respectively of the solid elements;
   said first and second layers being attached to each other so as to position the second plurality of solid elements centrally over the intersections of the vertical and horizontal gaps of the first layer; and
   said panel thereby including isolated gap islands that are bounded by said first and second solid elements but are not blocked by any solid elements in the slash-protecting garment.

19. The garment of claim 18, wherein the garment is one of a T-shirt, a shirt, an apron, a sleeve, a smock, a jacket, and a pair of pants.

* * * * *